(12) United States Patent
Oguchi et al.

(10) Patent No.: US 6,816,386 B2
(45) Date of Patent: Nov. 9, 2004

(54) CARD CONNECTOR FOR RECEIVING INFORMATION CARD WITH IDENTIFIER THEREIN

(75) Inventors: Wataru Oguchi, Miyagi-ken (JP); Toru Wagatsuma, Miyagi-ken (JP); Yoshimasa Kuroda, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 179 days.

(21) Appl. No.: 10/041,339

(22) Filed: Jan. 7, 2002

(65) Prior Publication Data

US 2002/0101722 A1 Aug. 1, 2002

(30) Foreign Application Priority Data

Jan. 15, 2001 (JP) ........................................ 2001-006993

(51) Int. Cl.[7] ............................. H05K 7/10; H05K 7/12
(52) U.S. Cl. .................. 361/769; 361/733; 361/737; 361/752; 361/781; 439/188; 439/630
(58) Field of Search ................................. 439/630, 188, 439/923, 159, 155, 152, 328, 76.1; 361/683, 684, 685, 686, 724–728, 731–733, 737, 740–742, 747, 752, 769, 754, 756, 759, 781, 801, 802; 235/491, 492, 444, 483, 485

(56) References Cited

U.S. PATENT DOCUMENTS

| | | | | |
|---|---|---|---|---|
| 6,099,335 A | * | 8/2000 | Chang | 439/188 |
| 6,126,464 A | | 10/2000 | Chang | |
| 6,399,906 B1 | * | 6/2002 | Sato et al. | 200/61.59 |
| 6,431,893 B1 | * | 8/2002 | Chang et al. | 439/188 |

* cited by examiner

*Primary Examiner*—Phung T. Vu
(74) *Attorney, Agent, or Firm*—Beyer Weaver & Thomas (57) ABSTRACT

A compact card connector having reduced width and thickness is provided for receiving an information card whereby the information card has a narrow step-like recess along one of its side edges and a sliding identifier mechanism provided in a concave cut in the step. The card connector includes a frame that receives the information card, and an identifier detecting means for detecting a sliding position of the identifier. The identifier detecting means includes a suitably placed fixed contact member and a movable contact member which are mounted on the frame, with part of the movable contact member forming a projection for detecting the sliding position of the identifier, whereby the projection lies in an area within the housing space through which the step-like recess of the card is to pass. As the information card is inserted into the housing space, the projection touches an upper surface of the step-like recess and/or that of the identifier and works in the concave cut in the step.

3 Claims, 9 Drawing Sheets

FIG. 10A  BEFORE LOADING OF CARD

FIG. 10B  CARD LOADING UNDER WAY

FIG. 10C  CARD HELD IN PLACE

CARD CONNECTOR FOR RECEIVING INFORMATION CARD WITH IDENTIFIER THEREIN

BACKGROUND OF THE INVENTION

1. Field of the Invention

The present invention relates to a card connector which receives and holds an information card with a built-in semiconductor chip therein and connects an external connection terminal of the card to circuitry formed on a circuit board, and particularly to means for detecting a sliding identifier mechanism provided on such an information card.

2. Description of Related Art

An information card which incorporates a semiconductor chip has been commonly known as one type of portable information device which is detachably loaded in electronic equipment such as personal computer, camcorder, electronic camera or cellular phone. This type of information card includes an information card which has a narrow recess (step-like portion) along its side edge with a sliding identifier mechanism provided in a concave notch in the recess so that recording of information onto the information card or reproduction of information from it can be disallowed by sliding the identifier in the notch.

Electronic equipment in which an information card can be loaded comprises a circuit board bearing required electronic circuitry and a card connector for connecting the external connection terminal of the information card to the electronic circuitry on the circuit board.

Figure 13:
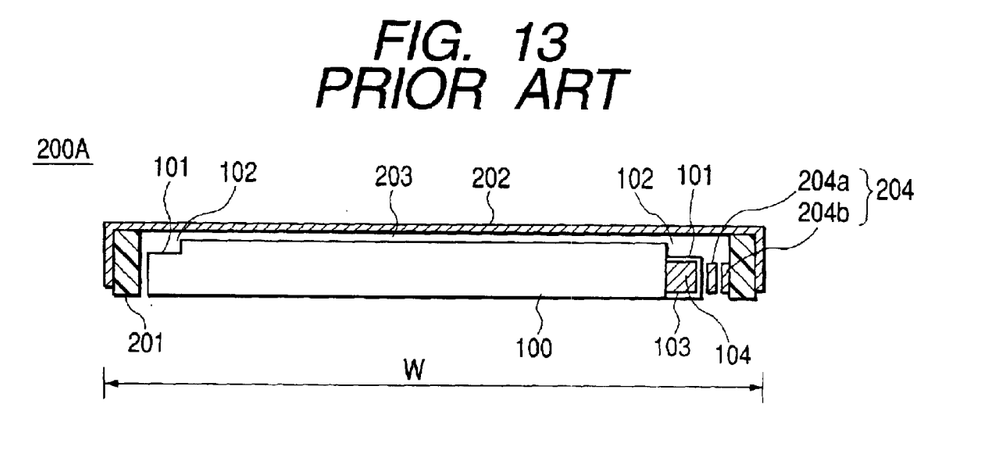
FIG. 13 is a sectional view of a card connector as a first example of a conventional model.

Next, a conventional card connector will be described referring to FIGS. 13 and 14. FIG. 13 is a sectional view of a card connector with an information card loaded therein as a first example of a conventional model, and FIG. 14 is a sectional view of a card connector with an information card loaded therein as a second example of a conventional model.

In these figures, reference numeral 100 represents an information card; 101 represents a narrow recesses in the side edges of the information card 100; 102 represents a space formed in the recesses of the information card; 103 represents a concave notch cut in the recess 101; 104 represents a sliding identifier mechanism provided in the concave notch 103; 200A and 200B represent card connectors; 201 represents a frame made of an insulating material; 202 represents a cover made of metal; 203 represents a housing space for insertion of the information card 100 defined by the frame 201 and cover 202; and 204 represents an identifier detecting means consisting of a movable contact member 204a and a fixed contact member 204b.

In the card connector 200A as shown in FIG. 13, the movable contact member 204a and fixed contact member 204b which constitute the identifier detecting means 204 are disposed facing the side face of the recess 101 in the information card 100. When the information card 100 is inserted into the housing space 203 in the card connector 200A and the recess 101 touches the movable contact member 204a, the movable contact member 204a elastically deforms and touches the fixed contact member 204b; then as the information card 100 is inserted all the way into the housing space 203, the area of contact between the movable contact member 204a and the recess 101 falls into the concave notch 103 cut in the recess 101, which restores the movable contact member 204a to its initial state due to its elastic force, and lets it go away from the fixed contact member 204b. When the information card 100 is fully inserted into the housing space 203, the area of contact between the movable contact member 204a and the recess 101 comes to ride on the identifier 104 provided in the concave notch 103, which causes the identifier 104 to push the movable contact member 204a and thus keep it in contact with the fixed contact member 204b. This makes it possible to detect the current position of the identifier 104 in the concave notch.

Figure 14:
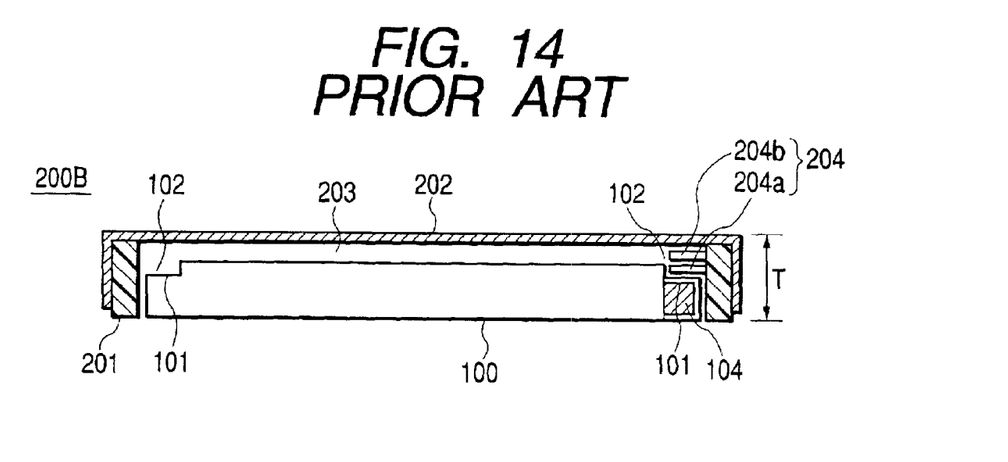
FIG. 14 is a sectional view of a card connector as a second example of a conventional model.

On the other hand, in the card connector 200B as shown in FIG. 14, the movable contact member 204a and fixed contact member 204b which constitute the identifier detecting means 204 are disposed facing the upper face of the recess 101 in the information card 100. The current position of the identifier 104 is detected in the same manner as mentioned above.

For a card connector for use in electronic equipment, particularly portable electronic equipment, compactness is strongly demanded to make the electronic equipment compact, lightweight and multifunctional.

In this sense, however, the card connector 200A as the first example in FIG. 13 has a drawback: because the movable contact member 204a and fixed contact member 204b which constitute the identifier detecting means 204 are disposed facing the side face of the recess 101 in the information card 100, it requires a width W which is larger than a card connector without identifier detecting means. The card connector 200B as the second example in FIG. 14 also has a drawback: because the movable contact member 204a and fixed contact member 204b which constitute the identifier detecting means 204 are disposed facing the upper face of the recess 101 in the information card 100, it requires a thickness T which is larger than a card connector without identifier detecting means.

SUMMARY OF THE INVENTION

The present invention is intended to solve the above problem. Accordingly, an object of the present invention is to reduce the size of a card connector with identifier detecting means.

In order to achieve the above objective, as a first solution, the present invention provides a card connector for receiving an information card therein, where the information card has a narrow step recess along one of its side edges and a sliding identifier mechanism provided in a concave cut in the step recess. The card connector further comprising a frame which constitutes a housing space into which the information card is inserted, and an identifier detecting means for detecting a sliding position of the identifier. The identifier detecting means comprising a fixed contact member and a movable contact member which are mounted on the frame, with part of the movable contact member forming a projection for detecting the sliding position of the identifier, whereby the projection lies in an area within the housing space through which the step of the card is to pass, where as the information card is inserted into the housing space, the projection touches an upper surface of the step and/or that of the identifier and works in the concave cut in the step.

When the movable contact member and fixed contact member, which constitute the identifier detecting means, are located on the upper surface of the frame, there is no need to make a space in the information card housing space for holding the movable contact member and fixed contact member, and therefore, a situation where the width W of the card connector (see FIG. 13) has to be considerably large can be avoided. In addition, the projection as part of the movable contact member lies in the area within the housing space through which the step of the card is to pass, and when the information card is inserted into the housing space, the projection touches the upper surface of the step and/or the upper surface of the identifier and works in the notched concave area of the step so that the movable contact member and fixed contact member, constituting the identifier detecting means, never protrude above the housing space. Therefore, it is possible to avoid a situation where the thickness T of the card connector (see FIG. 14) has to be relatively large. For at least these reasons, a compact card connector having identifier detecting means can be realized.

As a second solution according to the present invention, the movable contact member in the above first solution is held under tension in such a manner as to touch the fixed contact member, and when there is no information card inserted in the housing space, the contact members stay electrically connected with each other.

In the above configuration, when no information card is in the housing space, the movable contact member and fixed contact member constituting the identifier detecting means are electrically connected with each other. This means that the card connector is suitable for use with electronic circuitry having normally-closed signal processing circuitry.

As a third solution according to the present invention, one end of the movable contact member in the first solution protruding from a rear end of the frame is soldered to a circuit board and one end of the fixed contact member protruding from a front end of the frame is soldered to the circuit board.

In the above configuration, the connection between the movable contact member and the circuit board and that between the fixed contact member and the circuit board can be separated from each other in the direction of depth with respect to the frame. This makes it possible to simplify the structure of the movable contact member and that of the fixed contact member and also to simplify the arrangement of the connections, leading to a compact card connector, particularly with a reduced width.

As a fourth solution according to the present invention, in an innermost side of the housing space in the first solution there is insertion completion detecting means which detects the front end of the information card and senses that the information card has been placed in a prescribed position in the housing space, the insertion completion detecting means consisting of two metal strips which are disposed in such a manner as to be separable and touchable, with either of these metal strips integrally formed with the fixed contact member or movable contact member.

In the above configuration, either of the metal strips constituting the insertion completion detecting means and the fixed contact member or movable contact member can be combined as one component so that, for a card connector having insertion completion detecting means, such a decrease in the number of components results in cost reduction.

BRIEF DESCRIPTION OF THE DRAWINGS

The invention will be more particularly described with reference to the accompanying drawings, in which.

DETAILED DESCRIPTION OF THE EMBODIMENTS

Figure 1:
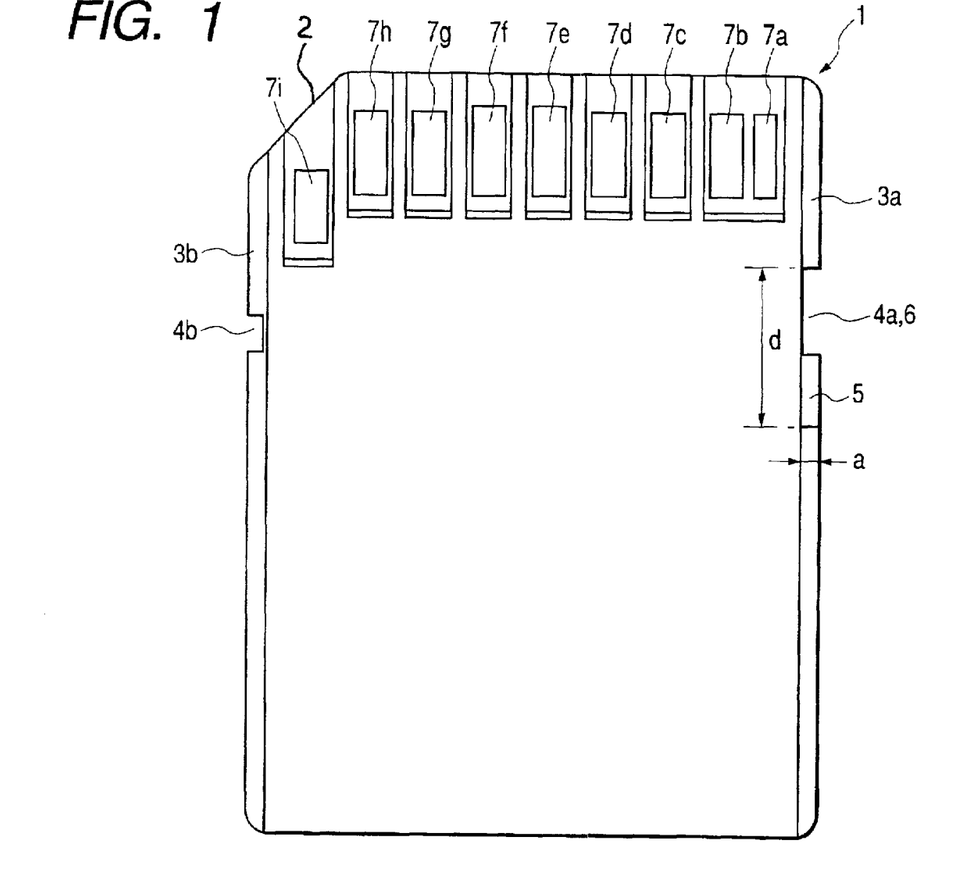
FIG. 1 is a top view of an information card.
Figure 2:
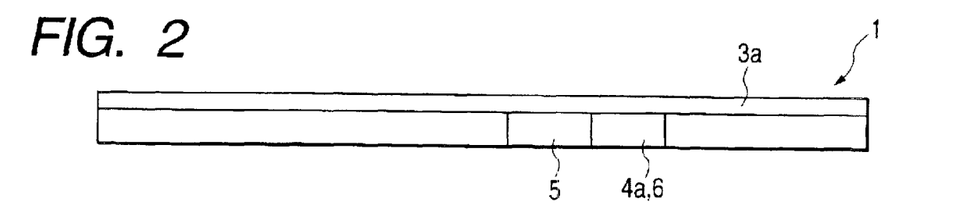
FIG. 2 is a side view of the information card as seen from its right edge side.
Figure 3:
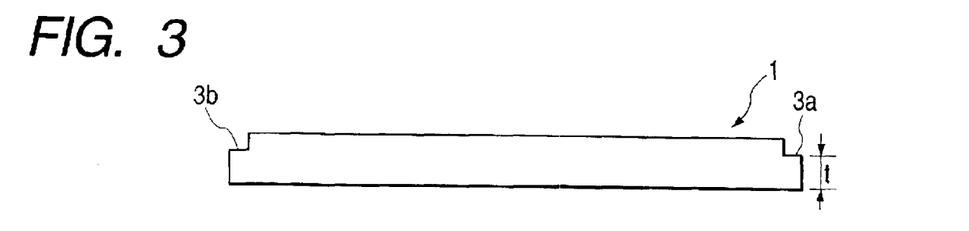
FIG. 3 is a side view of the card as seen from its rear edge side.

Before describing card connector embodiments according to the present invention, the structure of an information card to be loaded therein will be explained referring to FIGS. 1 to 3. FIG. 1 is a top view of an information card to be loaded in the card connector according to the present invention; FIG. 2 is a side view of the information card as seen from its right edge side; and FIG. 3 is a side view of the card as seen from its rear edge side.

As shown in FIG. 1, the planar shape of the information card 1 is a rectangle with an oblique side 2 in its left front corner. As shown in FIGS. 1 and 3, the upper portions of the right and left side edges are rectangularly cut to turn their lower portions into step recesses 3a and 3b and rectangular concave notches 4a and 4b are cut in front edge side portions of the step recesses 3a and 3b. In the concave notch 4a, which is wider than the concave notch 4b, a slideable identifier 5 is provided. As seen in FIGS. 1 and 2, the identifier 5 is a hexahedron which has a length nearly equal to one half of the width d of the concave notch 4a, a width nearly equal to the width a of the step-like recess 3a and a thickness nearly equal to the thickness t of the step-like recess 3a, and is flush with the step 3a in the direction of the thickness of the information card 1. Therefore, when the identifier 5 is moved toward the rear edge side of the information card 1, a detecting concave notch 6 with a length nearly equal to one half of the width d of the concave notch 4a is formed in front of the identifier 5. A plurality of external connection terminals (nine terminals in the case of FIG. 1) 7a to 7i are arranged in a suitable manner on the front edge of the upper surface of the card. These external connection terminals 7a to 7i are electrically connected with a semiconductor chip (not shown) built in the card so as to supply power to the chip and receive/transmit signals from/to external electronic equipment which incorporates the semiconductor chip and card connector.

In this information card 1, the slideable identifier 5 is provided in the concave notch 4a so that, for example, in order to disable or enable the write protection of the information card, the user can alter the position of the identifier 5 in the concave notch 4a to switch between two states: a state in which the detecting concave notch 6 exists and a state in which it does not exist. If the identifier 5 is used as a write-protector in this way, loss of important data can be prevented by setting the identifier 5 to the position for write protection.

Figure 4:
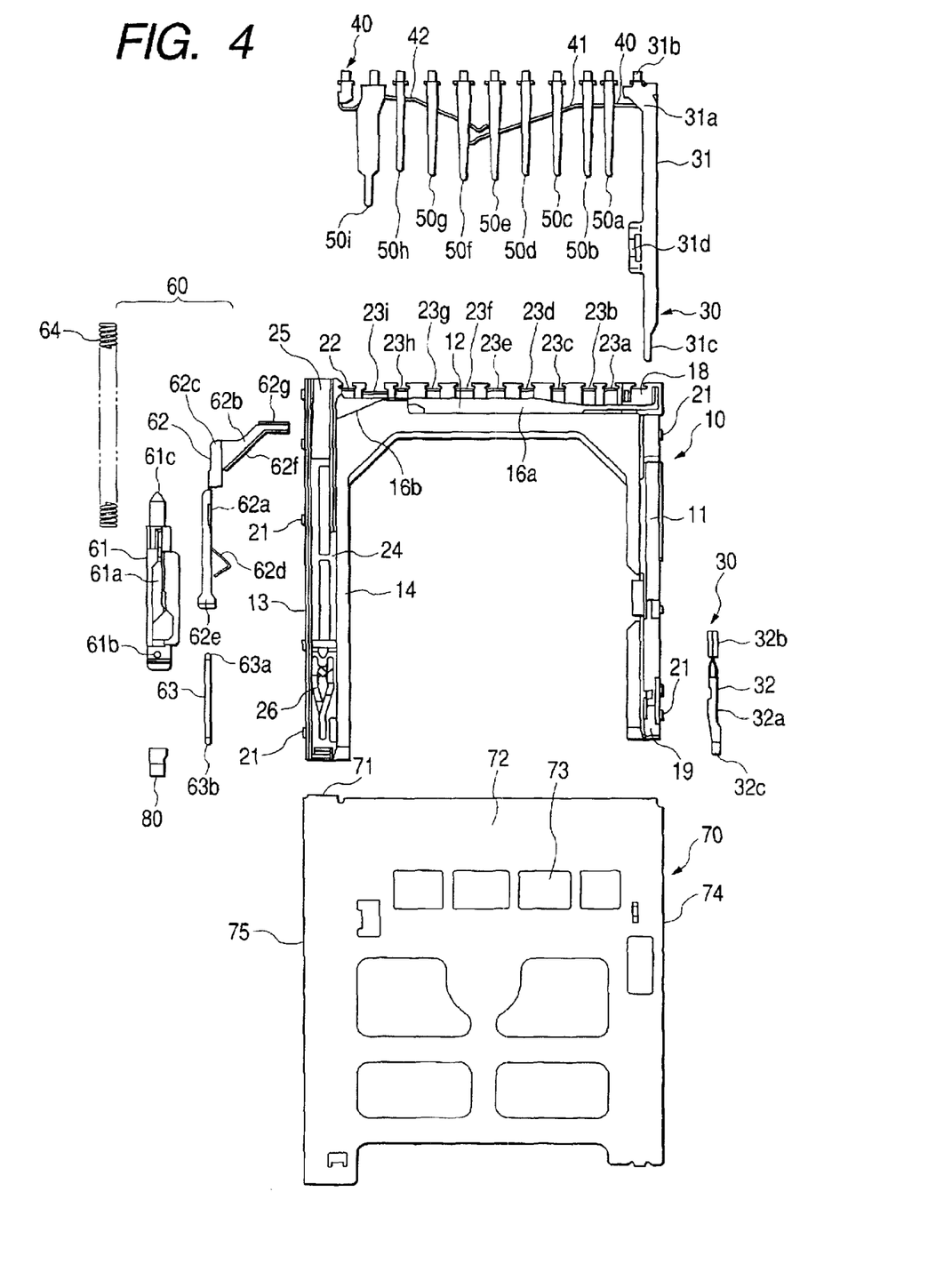
FIG. 4 shows components constituting a card connector.
Figure 5:
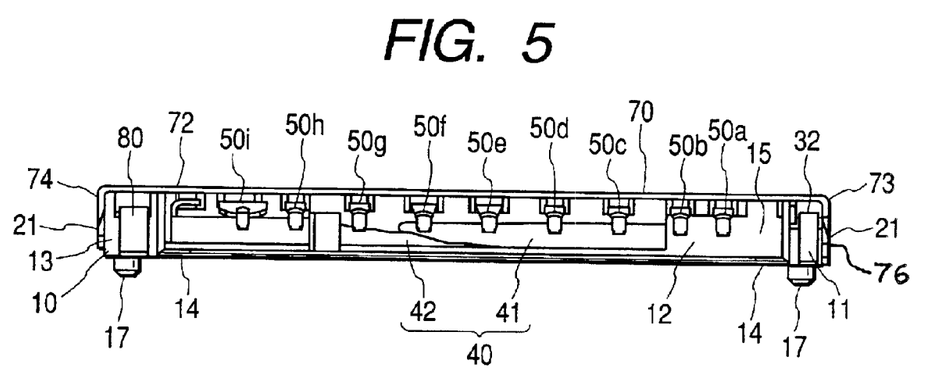
FIG. 5 is a sectional view of the card connector as seen from the information card insertion side.
Figure 6:
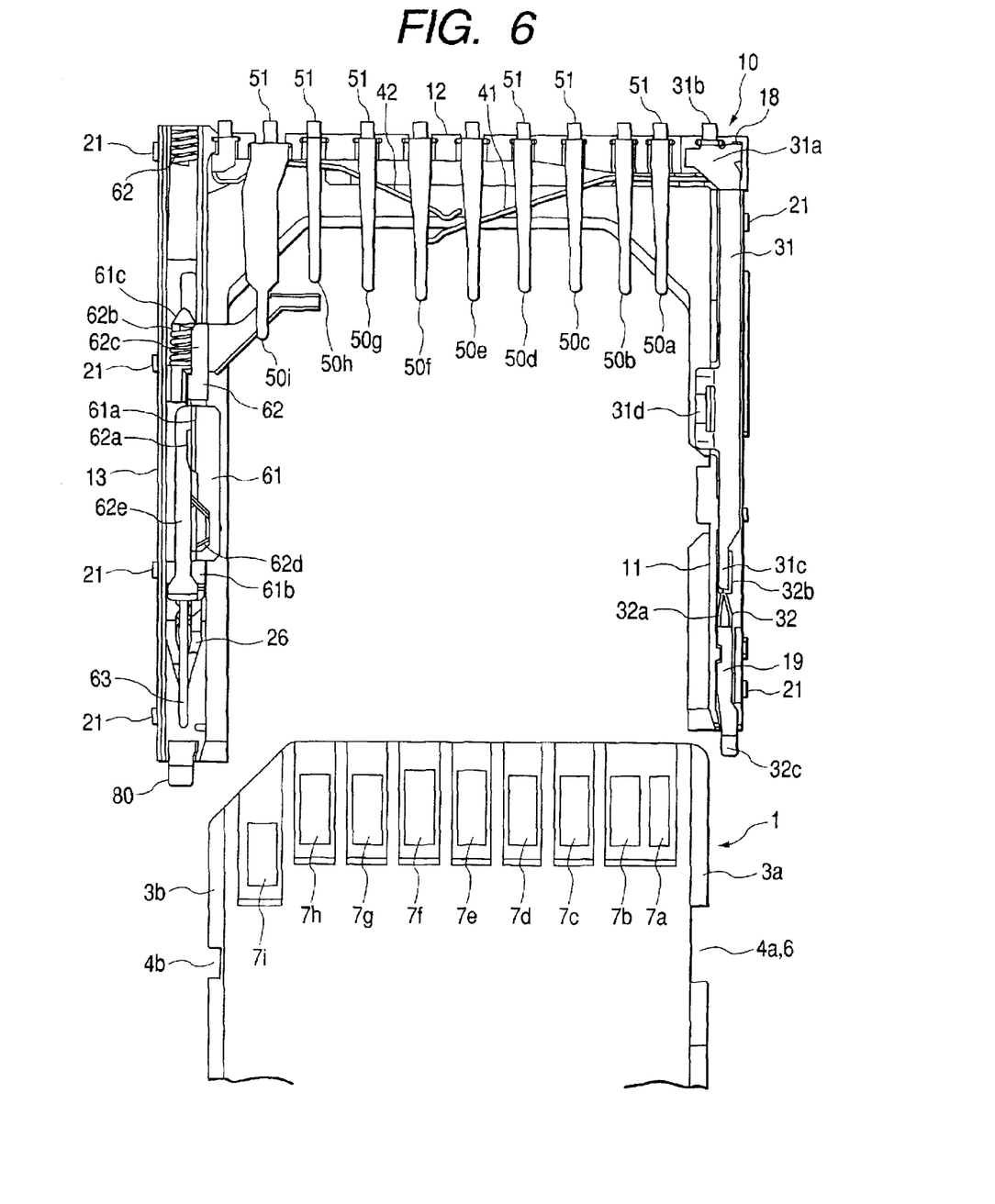
FIG. 6 is a top view partially showing the card connector with its cover removed and an information card.
Figure 7:
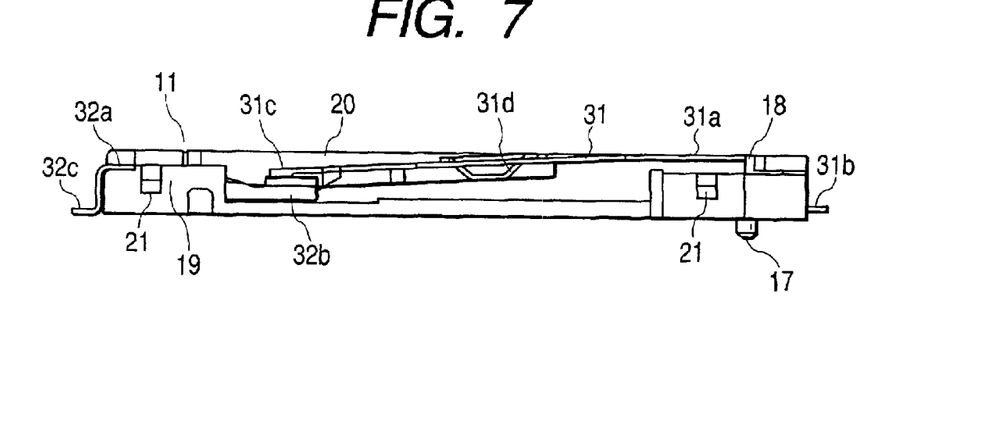
FIG. 7 is a side view of the card connector with its cover removed as seen from the side where identifier detecting means is mounted.
Figure 8:
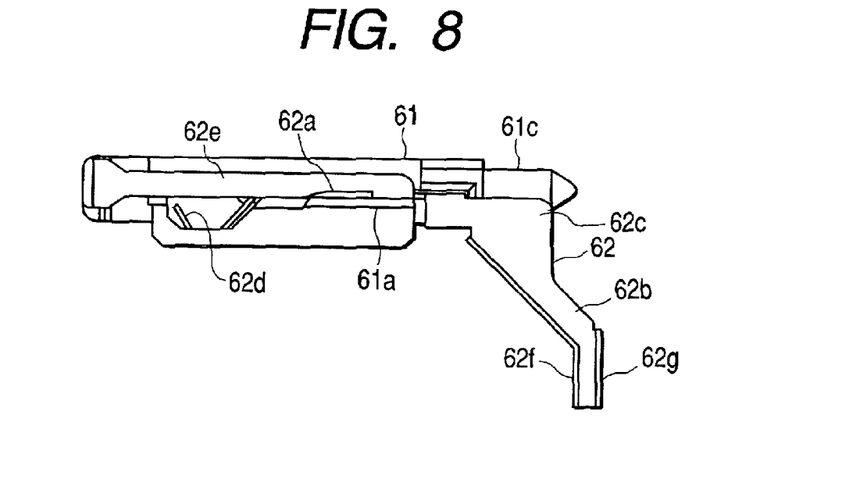
FIG. 8 is a top view of card loading/unloading means.
Figure 9:
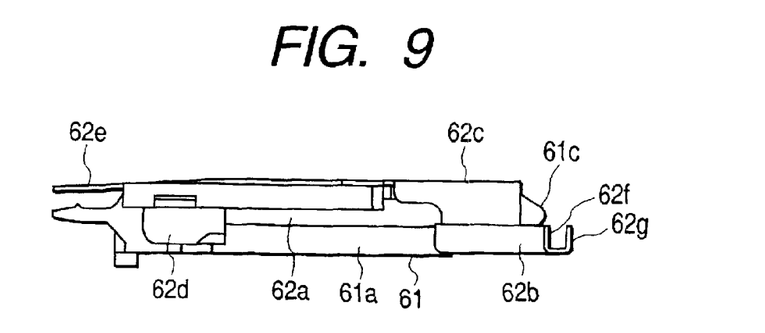
FIG. 9 is a side view of the card loading/unloading means.

Next, card connectors according to embodiments of the present invention will be detailed by reference to FIGS. 4 to 9. FIG. 4 shows components constituting a card connector; FIG. 5 is a sectional view of the card connector as seen from the information card insertion side; FIG. 6 is a top view partially showing the card connector with its cover removed and an information card; FIG. 7 is a side view of the card connector with its cover removed as seen from the side where identifier detecting means is mounted; FIG. 8 is a top view of card loading/unloading means; and FIG. 9 is a side view of the card loading/unloading means.

As shown in FIG. 4, the card connector according to the present invention comprises: a frame 10 having virtually an inverted U planar shape; an identifier detecting means 30, an insertion completion detecting means 40 and contacts 50a to 50i which are all fitted to the frame 10; a slideable card loading/unloading means 60 which is mounted on the frame 10; a cover 70 for covering the upper surface of the frame 10; and a peg 80 (FIG. 5) for fixing the frame 10 onto a circuit board (not shown).

Made of an insulating resin, the frame 10 has a virtually inverted U planar shape which is defined by the following holding portions: a holding portion 11 for the identifier detecting means 30, a holding portion 12 for the insertion completion detecting means 40 and contacts 50a to 50i, and a holding portion 13 for the card loading/unloading means 60. As shown in FIGS. 5 and 6, thin ribs 14 extend inward from the inside bottom of the frame 10 to support the bottom surface of the information card 1. A housing space 15 for insertion of the information card 1 is formed by the following: the upper faces of the ribs 14, the inner surfaces of the above-mentioned holding portions 11, 12, and 13, and the bottom surface of the cover 7. As illustrated in FIGS. 4 and 6, a stopper piece 16a for the information card 1 is located opposite to the inner surface of the holding portion 12 and a triangular projection 16b for preventing improper insertion of the information card 1 is located in the corner where the holding portion 12 and the holding portion 13 intersect each other. Positioning pins 17 (FIG. 5) protrude from the bottom surface of the frame 10 with their tips facing down to determine the position of the frame 10 with respect to the circuit board (not shown), as illustrated in FIGS. 5 and 7.

This frame 10 is fitted to a specific area on the circuit board by inserting the positioning pins 17 into positioning holes made in the circuit board. After positioning the frame with respect to the circuit board, one end of the peg 80 is engaged with the tip of the holding portion 13 and its other end is fixed onto the circuit board so that the frame is secured in place.

As shown in FIGS. 6 and 7, the holding portion 11 for the identifier detecting means 30 is inclined, namely higher at the back side (side of the holding portion 12) than at the side where the information card 1 is inserted, while at the back side end is a support 18 for a movable contact member 31 as part of identifier detecting means 30 and at the card insertion side is a support 19 for a fixed contact member 32 as part of identifier detecting means 30. Also, there is a space 20 for movement of the movable contact member 31 between the supports 18 and 19. On the outer surface of the holding portion 11 is a lug 21 for snapping the cover 70 into place, as shown in FIGS. 4 to 7.

As shown in FIGS. 4 and 6, disposed in a predetermined manner on the holding portion 12 for the insertion completion detecting means 40 and contacts 50a to 50i are a support 22 for a metal strip 42 on the side of the holding portion 13 for the card loading/unloading means 60, and receivers 23a to 23i for the contacts 50a to 50i, where two metal strips 41 and 42 make up the insertion completion detecting means 40.

As shown in FIGS. 4 and 6, the holding portion 13 for the card insertion means 60 includes: a holder 24 for the slider 61 as part of the card loading/unloading means 60; a holder 25 for tension applying means 62 as part of the card loading/unloading means 60; and a heart-shaped cam groove 26 for guiding the card loading/unloading means 60 to a required position and holding it there as the information card 1 is loaded into or unloaded from the housing space 15. Also, as shown in FIGS. 4 to 6, on the outer surface of the holding portion 13, there is a lug 21 for snapping the cover 70 into place.

As shown in FIGS. 4 to 7, the identifier detecting means 30 consists of a movable contact member 31 and a fixed contact member 32. The movable contact member 31, which is formed from a metal piece, has an engagement 31a and a fixing portion 31b at one end and a contact portion 31c at the other end, where the engagement 31a is to engage the support 18 on the frame 10, and the fixing portion 31b protrudes in the direction of depth (front-back) of the frame 10 and is soldered to the circuit board (not shown). Furthermore, the contact portion 31c is to contact the fixed contact member 32. On the movable contact member 31 is a projection 31d for detecting the current position of the identifier 5, which protrudes into the housing space 15. The projection 31d has a size that is suitable for insertion into the detecting concave notch 6 in the information card 1 (FIG. 1). On the other hand, the fixed contact member 32, which is formed from a metal piece, has an engagement 32a in the center, a contact portion 32b at one end and a fixing portion 32c at the other end, where the engagement 32a is to engage the support 19 on the frame 10, and the contact portion 32b is to contact the contact portion 31c of the movable contact member 31, whereby the fixing portion 32c protrudes towards the end face of the frame 10 on the information card insertion side and is soldered to the circuit board (not shown).

The movable contact member 31 is set in position on the upper surface of the holding portion 11 with the contact portion 31c facing the information card insertion side of the frame 10 and the engagement 31a engaged with the support 18. The fixing portion 31b is fixed onto the holding portion 11 and electrically connected with the electronic circuitry on the circuit board (not shown) by soldering fixing portion 3b to the circuit board. The fixed contact member 32 is set in position on the holding portion 11 with the contact portion 32b disposed so as to be able to touch the contact portion 31c of the movable contact member 31 and the engagement 32a engaged with the support 19. The fixing portion 32c is fixed onto the holding portion 11 and electrically connected with the electronic circuitry on the circuit board (not shown) by soldering fixing portion 32c to the circuit board. As shown in FIG. 7, regarding the movable contact member 31, the contact portion 31c is curved downward with respect to the engagement 31a and held in contact with the contact portion 32b of the fixed contact member 32 as far as any upward force is not applied to the projection 31d.

Referring to FIGS. 4 to 6, the insertion completion detecting means 40 consists of a first metal strip 41 and a second metal strip 42. The first metal strip 41 is integrally formed with the movable contact member 31 and its base end is on the inner face of one end of the holding portion 12 and its tip is in the housing space 15 for the information card 1. The second metal strip 42 is independent and separate from the first metal strip 41 and its base end is engaged with the support 22 on the holding portion 12 and its tip is in the housing space 15 for the information card 1. Before the information card 1 is loaded in the space 15, the tips of these metal strips 41 and 42 are located nearer to the card insertion side of the information card 1 than the information card stopper piece 16a of the information card 1 on the frame 10 and separate from each other. As the information card 1 is inserted and comes near the stopper piece 16a, the tips are elastically deformed by the force of insertion of the information card 1 and brought into contact with each other. The second metal strip 42 is fixed in place and electrically connected with the electronic circuitry on the circuit board (not shown) by soldering a fixing portion 42a protruding from the inner side of the holding portion 12 to the circuit board.

As shown in FIGS. 4 and 6, regarding the contacts 50a to 50i, which, for example, are formed of sheet metal, their base ends engage receivers 23a to 23i on the holding portion 12 respectively and their tips are located in the housing space 15 for the information card 1. The tips of the contacts 50a to 50i are disposed in a way that they come to contact external contact terminals 7a to 7i of the information card 1 respectively when the information card 1 is inserted deep enough to touch the stopper piece 16a. These contacts 50a to 50i are fixed in place and are electrically connected with the electronic circuitry on the circuit board (not shown) by soldering a fixing portion 51 protruding from the inner side of the holding portion 12 to the circuit board.

As shown in FIG. 4, the card loading/unloading means 60 is composed of a plastic slider 61, and a metal 62 formed, for example, of sheet metal; a metal engagement pin 63 which is rotatably attached to one end of the slider 61, and tension applying means 64 for pushing the slider 61, metal 62, and engagement pin 63 in the direction of unloading the information card 1, and a heart-shaped cam groove 26 to engage one end of the engagement pin 63. The heart-shaped cam groove 26 and engagement pin 63 make up a locking mechanism for locking the slider 61 and metal 62 in a prescribed card unloading or loading position.

As shown in FIGS. 4, 8 and 9, a press-fitting portion 61a for the metal 62, a mounting hole 61b for the engagement pin 63, and the projection 61c for holding the tension applying means 64 are integrated into the slider 61.

Integrated into the metal 62 are the following: a receiver 62a to be press-fitted into the holding portion 61a in the slider 61; a contact area 62b to touch the front edge of the information card 1 inserted in the housing space 15; a contact portion 62c to touch the metal tension applying means 64 attached to the projection 61c; a card stopper 62d to engage the concave notch 4b cut in a side edge of the information card 1 to prevent the card 1 from coming off; and a tension applying means 62e for holding down the tip of the engagement pin 63, one end of which is rotatably fitted into the mounting hole 61b, thereby preventing the engagement pin 63 from coming off the heart-shaped cam groove 26 in the holding portion 13 for the card loading/unloading means 60. There are reinforcing ribs 62f and 62g standing at both ends of the contact area 62b. This embodiment uses one rib at each end of the contact area 62b (ribs 62f and 62g); however, the rib 62g, which is not to touch the information card 1 directly, can be omitted. By way of example, the metal 62 is fixed onto the slider 61 by press-fitting the receiver 62a into the press-fitting portion 61a in the slider 61.

Both ends of the engagement pin 63 are bent squarely in the same direction and one bending end 63a is rotatably inserted into the mounting hole 61b in the slider 61.

One end of the tension applying means 64 is attached to the holding projection 61c on the slider 61 and touches the contact portion 62c on the metal 62 fitted to the slider 61. In this embodiment, a coil spring is used as the tension applying means 64 as illustrated; however, the present invention is not limited thereto. Any elastic material may be used in place of the coil spring.

As shown in FIG. 6, in the card loading/unloading means 60 thus assembled, the slideable slider 61 is housed in the holder 24 on the holding portion 13 for the frame 10 and the tension applying means 62 is housed in the holder 25, and the heart-shaped cam groove 26 is engaged with the other bending end 63b of the engagement pin 63. The other end of the tension applying means 62 touches the spring stopper 71 as part of the cover 70 (see FIG. 4).

The cover 70, which is formed of metal, has the shape of a flattened inverted U as viewed from the side for insertion of the information card 1 as shown in FIG. 5, and there is a spring stopper 71 in its corner facing one end of the tension applying means 62 as shown in FIG. 4. As shown in FIG. 4, the top plate 72 of the cover 70 has windows 73 made in a prescribed manner; as shown in FIG. 5, the side plates 74 and 75 have engagement holes 76 for engaging the engagement lugs 21 provided on the outer surface of the holding portions 11 and 13 as part of the frame 10. As illustrated in FIG. 5, regarding the cover 70 thus structured, the inner surface of the top plate 72 touches the upper surfaces of the holding portions 11, 12 and 13, and also the inner surfaces of the side plates 74 and 75 touch the outer surfaces of the holding portions 11 and 13, and the engagement lugs 21 engage the engagement holes 76 in the side plates 74 and 75 so that the cover 70 snaps into the frame 10.

Figure 10A:
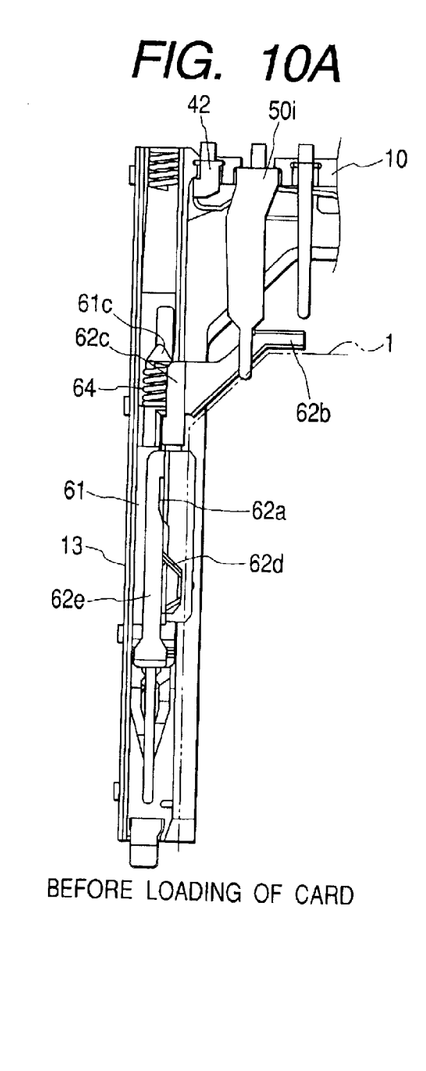
FIGS. 10A, 10B and 10C illustrate how the identifier detecting means works.
Figure 10B:
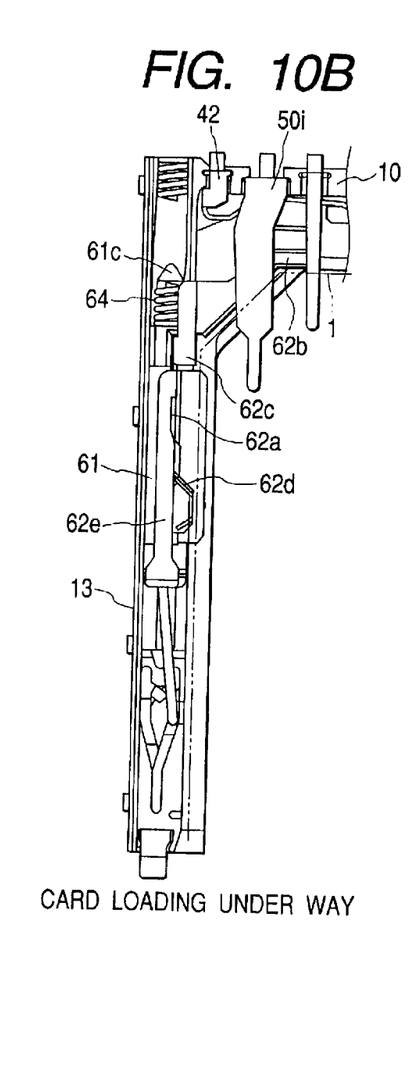
Figure 10C:
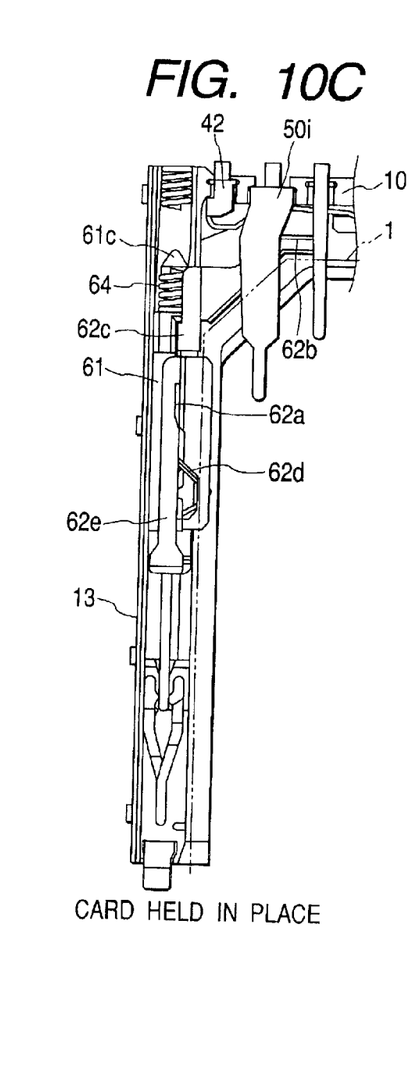
Figure 11A:
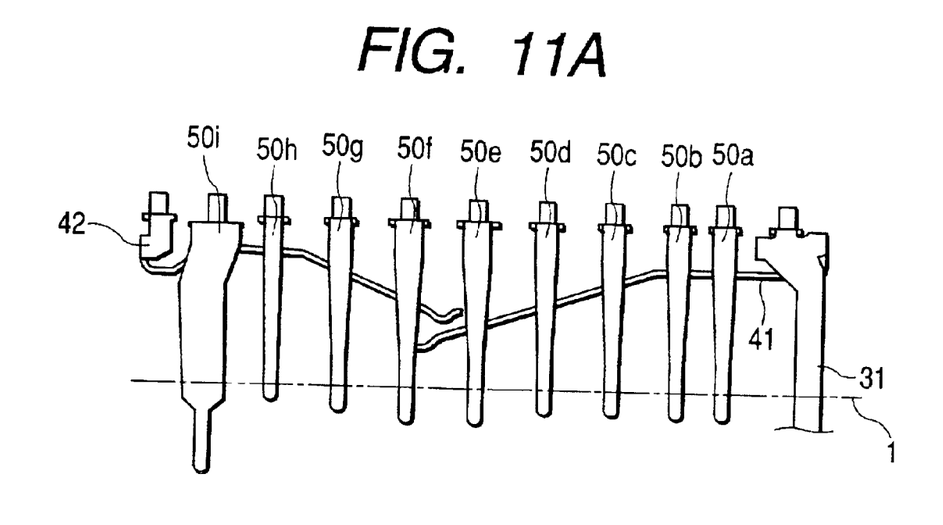
FIGS. 11A and 11B illustrate how the insertion completion detecting means works.
Figure 11B:
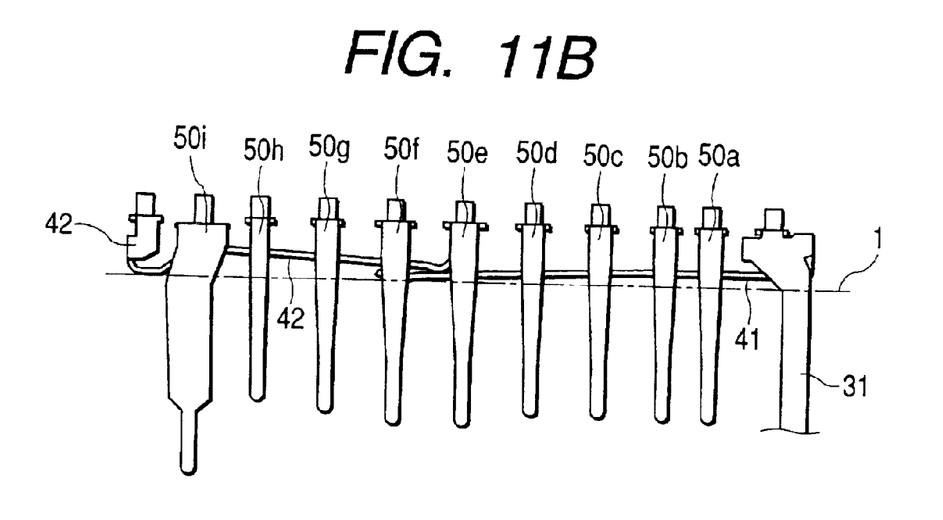

Next, how the card connector according to the present embodiment works will be described referring to FIGS. 10 to 12. FIGS. 10A, 10B and 10C illustrate the way the card loading/unloading means works; FIGS. 11A and 11B illustrate the way the insertion completion detecting means works; and FIGS. 12A to 12D illustrate the way the identifier detecting means works.

As shown in FIG. 7, prior to inserting the information card 1 into the housing space 15, the movable contact member 31 and the fixed contact member 32 are electrically connected so that this structure can be applied to electronic circuitry having normally-closed signal processing circuitry. Two metal strips 41 and 42, which constitute the insertion completion detecting means 40, are not in touch with each other as shown in FIG. 6, indicating that the information card 1 is not inserted in the housing space 15. As shown in FIGS. 6 and 10A, the slider 61, metal 62 and engagement pin 63, which constitute the card loading/unloading means 60, are located nearest to the information card insertion side by the elastic force of the tension applying means 64.

As the information card 1 is inserted into the housing space 15 in a prescribed way under this condition, the step-like recess 3a of the information card 1 touches the projection 31d on the movable contact member 31 and the movable contact member 31 is pushed upward by the force of insertion of the card 1, which electrically disconnects the movable contact member 31 from the fixed contact member 32.

When the information card 1 is inserted further, the front edge of the information card 1 touches the contact area 62b of the card loading/unloading means 60 and the card stopper 62d on the metal 62 of the card loading/unloading means 60 engages the concave notch 4b cut in the step-like recess 3b of the information card 1. Then, as the information card 1 is further pushed in, as illustrated in FIG. 10B, the card loading/unloading means 60 further moves toward the innermost part of the frame 10 against the elastic force of the tension applying means 64 and accordingly the bending end 63b of the engagement pin 63 moves towards the innermost part of the frame 10 through the loading path 26a of the heart-shaped cam groove 26.

As the information card is inserted all the way until it reaches the innermost part of the housing space 15, the front edge of the information card 1 touches the stopper piece 16a on the frame 10, which enables the user to feel with a tactile sensation that the information card 1 has been just set in place in the housing space 15. After that, as the user lets go his/her hold of the information card 1, and the card loading/unloading means 60 moves back toward the opening for insertion of the information card 1 due to the elastic force of the tension applying means 64, during which the bending end 63b of the engagement pin 63 is led into the guide 26b of the heart-shaped cam groove 26 to engage the insertion side stopper 26c as illustrated in FIG. 10C, so that the information card 1 is held in place in the housing space. In this condition, as shown in FIG. 11B, since the front edge of the information card 1 pushes inwards the first and second metal strips 41 and 42 constituting the insertion completion detecting means 40, these metal strips 41 and 42 elastically deform and come to touch each other, which notifies the circuitry that the information card 1 has been inserted all the way and is in place in the housing space 15. In this condition, since the card stopper 62d of the card loading/unloading means 60 is in engagement with the concave notch 4b of the information card 1, the information card 1 is held in place unless an external force larger than the elastic force of the card stopper 62d is applied, so that information can be recorded onto or reproduced from the information card 1 with stability.

Figure 12A:
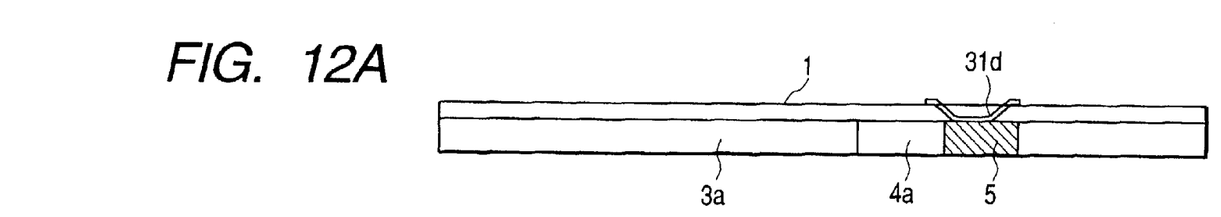
FIGS. 12A, 12B, 12C and 12D illustrate how the card loading/unloading means works.
Figure 12B:
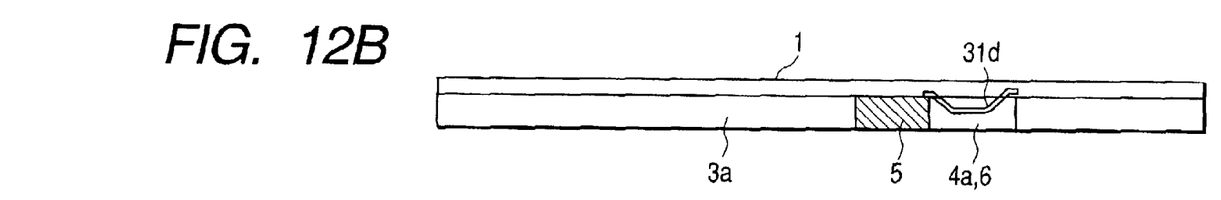
Figure 12C:
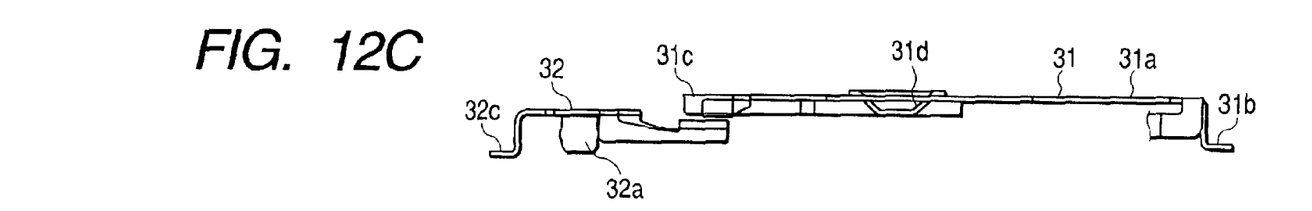
Figure 12D:
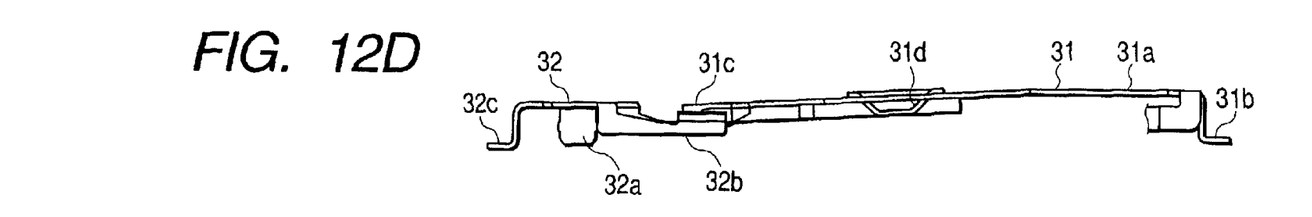

In this condition, when the identifier 5 of the information card 1 inserted into the housing space 15 is placed in the front half of the concave notch 4a, as shown in FIG. 12A, the projection 31d of the movable contact member 31 touches the upper surface of the identifier 5 and thus, as shown in FIG. 12C, the movable contact member 31 and the fixed contact member 32 are held separate from each other, which notifies the circuitry that the information card 1 is write-protected. On the other hand, when the identifier 5 of the information card 1 inserted into the housing space 15 is placed in the rear half of the concave notch 4a, as shown in FIG. 12B, the projection 31d of the movable contact member 31 falls into the concave notch 4a. This moves the tip of the movable contact member 31 downward due to its elasticity and thereby moves the movable contact member 31, as shown in FIG. 12D, and the fixed contact member 32 come to touch each other again, which notifies the circuitry that either data can be written to the information card 1, or the card is not write-protected.

When the information card 1 is inserted deeper in this condition, the engagement pin 63 and the insertion side stopper 26c of the heart-shaped cam groove 26 are disengaged from each other by the force of insertion and the bending end 63b of the engagement pin 63 moves to the unloading path 26d of the heart-shaped cam groove 26. Therefore, as the user lets go the information card 1 a while after, the card loading/unloading means 60 is pushed back toward the opening for insertion of the information card 1 by the elastic force of the tension applying means 64 and reset to the state in which it was before insertion of the card; and also because the front edge of the information card 1 is pressed by the contact area 62b of the card loading/unloading means 60, the information card 1 is forced out of the housing space 15. During this card unloading process, the card stopper 62d of the card loading/unloading means 60 is in engagement with the concave notch 4b of the information card 1, preventing the information card 1 from accidentally coming off the housing space 15 and thus being damaged.

If the information card is inserted into the housing space 15 the wrong way, a corner of the information card 1 touches the projection 16b for preventing improper insertion of the card 1 and the card cannot be inserted all the way, thereby eliminating the possibility that trouble may be caused by improper insertion. If the information card 1 touches the projection 16b, as the user lets go the information card 1, the card 1 is automatically unloaded from the housing space 15 by the elastic force of the tension applying means 64.

In the card connector thus constituted according to this embodiment, the movable contact member 31 and the fixed contact member 32, which constitute the identifier detecting means 30, are located on the upper surface of the frame 10, where there is no need to make a space in the housing space 15 for the information card 1 for holding the movable contact member 31 and the fixed contact member 32, thereby making it possible to reduce the width of the card connector. In addition, the projection 31d as part of the movable contact member 31 lies in the area within the housing space 15 through which the step-like recess 3a of the card is to pass; and when the information card 1 is inserted into the housing space 15, the projection 31d touches the upper surface of the step-like recess 3a and/or the upper surface of the identifier 5 and works in the concave notched area of the step-like recess 3a so that the movable contact member 31 and the fixed contact member 32 never protrude above the housing space 15 for the information card 1. Therefore, it is possible to realize a card connector with a reduced thickness. For at least these reasons, a compact card connector having identifier detecting means 30 can be realized.

In the card connector according to this embodiment, when no information card 1 is in the housing space 15 the movable contact member 31 and the fixed contact member 32 constituting the identifier detecting means 30 are electrically connected. This means that the card connector is suitable for use with electronic circuitry having normally-closed signal processing circuitry.

In the card connector according to this embodiment, one end of the movable contact member 31 protruding from the rear end of the frame 10 is soldered to the circuit board, and one end of the fixed contact member 32 protruding from the front end of the frame 10 is soldered to the circuit board, such that the connection between the movable contact member 31 and the circuit board and that between the fixed contact member 32 and the circuit board can be separated from each other in the direction of depth with respect to the frame 10. This makes it possible to simplify the structure of both the movable contact member 31 and that of the fixed contact member 32 and also to simplify the arrangement of the connections, thereby leading to a compact card connector, particularly with a reduced width.

In the card connector according to this embodiment, one of the metal strips 41 constituting the insertion completion detecting means 40 is integrally formed with the movable contact member 31. Consequently, the metal strip 41 and the movable contact member 31 can be combined as one component; for a card connector having insertion completion detecting means 40, such a decrease in the number of components results in cost reduction.

In the card connector according to this embodiment, the contact area 62b, which is formed of sheet metal, can be smaller and more rigid than one made of plastic, so the size of the card connector can be reduced. Also, since the contact area 62b is disposed facing the front edge of the information card 1, upon loading or unloading of the information card 1, no momentum is given to the information card 1 so loading and unloading of the information card 1 take place smoothly. Further, the contact area 62b is preferably press-fitted into the slider 61, which means that a complicated manufacturing process such as insert molding is not needed and a required card connector can be manufactured at low cost.

In the card connector according to this embodiment, there are reinforcing ribs 62f and 62g standing on the contact area 62b so that the rigidity of the contact area 62b formed of sheet metal can be increased and therefore the contact area 62b and the card connector can be more compact.

In the card connector according to this embodiment, the slider 61 has a card stopper 62d, which prevents the information card 1 from coming out when it engages the concave notch 4b in the side edge of the information card 1. This card stopper 62d is integrally formed with the contact area 62b so that the card stopper 62d and the contact area 62b can be combined as a single component. Moreover, by providing a card connector having a card stopper for preventing the information card 1 from coming out, the number of components can be decreased, resulting in cost reduction.

In the card connector according to this embodiment, the slider 61 has an engagement pin 63 as part of a locking mechanism and a tensioner 62e which applies tension to push the engagement pin 63 in one direction and the tensioner 62e is integrally formed with the contact area 62b so that the tensioner 62e and the contact area 62b can be combined as a single component and, therefore, for a card connector having an engagement pin 63 and a tensioner 62e, the number of components can be decreased, resulting in cost reduction.

In the card connector according to this embodiment, all metal components constituting the card loading/unloading means 60, namely the metal 62, engagement pin 63 and tension applying means 64 touch one another and the tension applying means 64 touch the metal cover 70 so that these metal components are held virtually grounded, leading to reduction in noise which affects the information card 1.

As discussed so far, in the card connector according to this embodiment, because the fixed contact member and movable contact member, which constitute the identifier detecting means, are located on the upper surface of the frame, there is no need to make a space for holding the fixed contact member and the movable contact member in the housing space for the information card, thus making it possible to reduce the width of the card connector. In addition, the projection as part of the movable contact member lies in the area within the housing space through which the step recess of the card is to pass; and when the information card is inserted into the housing space, the projection touches the upper surface of the step and/or the upper surface of the identifier and works in the concave notched area of the step, so that the movable contact member and the fixed contact member, which constitute the identifier detecting means, never protrude above the housing space. This means that it is possible to reduce the thickness of the card connector. Consequently, a compact card connector having identifier detecting means can be realized.

What is claimed is:

1. A card connector for receiving an information card therein, the information card having a narrow step-like recess along one of its side edges and a sliding identifier mechanism provided in a concave notch cut in the step-like recess, the card connector comprising:
a frame which constitutes a housing space into which the information card is inserted; and
identifier detecting means for detecting a sliding position of the identifier,
the identifier detecting means comprising:
a fixed contact member and a movable contact member which are mounted on the frame, with part of the movable contact member forming a projection for detecting the sliding position of the identifier, the projection lying in an area within the housing space through which the step of the card is to pass,
wherein, as the information card is inserted into the housing space, the projection detects the sliding position of the identifier by applying pressure along a normal direction of a plane including an upper surface of the information card, and
wherein one end of the movable contact member protruding from a rear end of the frame is soldered to a circuit board, and wherein one end of the fixed contact member protruding from a front end of the frame is soldered to the circuit board.

2. The card connector according to claim 1, wherein the movable contact member is held under tension in such a manner as to touch the fixed contact member, and when there is no information card inserted in the housing space, the contact members are electrically connected with each other.

3. A card connector for receiving an information card therein, the information card having a narrow step-like recess along one of its side edges and a sliding identifier mechanism provided in a concave notch cut in the step-like recess, the card connector comprising:
a frame which constitutes a housing space into which the information card is inserted; and
identifier detecting means for detecting a sliding position of the identifier;
the identifier detecting means comprising:
a fixed contact member and a movable contact member which are mounted on the frame, with part of the movable contact member forming a projection for detecting the sliding position of the identifier, the projection lying in an area within the housing space through which the step of the card is to pass,
wherein, as the information card is inserted into the housing space, the projection detects the sliding position of the identifier by applying pressure along a normal direction of a plane including an upper surface of the information card, and
wherein in an innermost part of the housing space there is insertion completion detecting means which detects the front end of the information card and senses that the information card has been placed in a suitable position in the housing space,
the insertion completion detecting means consisting of two metal strips which are disposed in such a manner as to be separable or touchable, with either of these metal strips integrally formed with the fixed contact member or movable contact member.

* * * * *